United States Patent
Kapur et al.

(10) Patent No.: US 11,301,900 B2
(45) Date of Patent: Apr. 12, 2022

(54) REAL-TIME MULTI-COMPUTER DATA EXCHANGE AND CONTROL SYSTEM

(71) Applicant: Bank of America Corporation, Charlotte, NC (US)

(72) Inventors: Monika Kapur, Jacksonville, FL (US); Nathan Dent, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 97 days.

(21) Appl. No.: 16/458,663

(22) Filed: Jul. 1, 2019

(65) Prior Publication Data
US 2021/0004869 A1    Jan. 7, 2021

(51) Int. Cl.
*G06Q 30/00* (2012.01)
*G06Q 30/02* (2012.01)
*G06N 20/00* (2019.01)
*H04W 4/23* (2018.01)
*H04W 4/021* (2018.01)

(52) U.S. Cl.
CPC ......... *G06Q 30/0261* (2013.01); *G06N 20/00* (2019.01); *G06Q 30/0267* (2013.01); *H04W 4/022* (2013.01); *H04W 4/23* (2018.02)

(58) Field of Classification Search
CPC ..... G06Q 30/0207–0277; H04W 4/23; H04W 4/022; G06N 20/00
See application file for complete search history.

(56) References Cited

U.S. PATENT DOCUMENTS

| | | | |
|---|---|---|---|
| 9,788,211 B2 | 10/2017 | Zhang | |
| 9,961,624 B1 | 5/2018 | Zait | |
| 10,257,668 B2 | 4/2019 | Shaw et al. | |
| 2013/0124298 A1* | 5/2013 | Li | G06Q 30/0241 705/14.42 |
| 2013/0254159 A1* | 9/2013 | Thramann | G06Q 30/0277 707/609 |
| 2015/0120420 A1* | 4/2015 | Richter | G06Q 30/0223 705/14.24 |
| 2016/0162936 A1* | 6/2016 | Khalil | G06Q 30/0261 705/14.52 |
| 2016/0253702 A1* | 9/2016 | Gonzales, Jr. | H04W 4/023 705/14.48 |
| 2017/0124594 A1* | 5/2017 | Naiga | H04M 3/4936 |
| 2020/0143425 A1* | 5/2020 | Greenberger | G06F 3/0488 |

* cited by examiner

*Primary Examiner* — Kambiz Abdi
*Assistant Examiner* — Christopher Stroud
(74) *Attorney, Agent, or Firm* — Banner & Witcoff, Ltd.

(57) ABSTRACT

Arrangements for dynamic data exchange and control are provided. In some examples, user device location data may be detected by a system. The location data may be detected in real-time and one or more entities within a predefined proximity of the detected location may be identified. A communication session may be established with a first entity of the one or more entities identified and a request for a first offer may be transmitted to the first entity. In response, a first offer may be received from the first entity and evaluated to determine whether it is an optimized offer. If so, the offer may be presented to the user. If not, a counter offer may be generated using machine learning. The counter offer may be transmitted to the first entity for evaluation and acceptance or generation of another counter offer. Upon agreeing to a particular offer, the offer may be transmitted to the user device.

17 Claims, 13 Drawing Sheets

REAL-TIME MULTI-COMPUTER DATA EXCHANGE AND CONTROL SYSTEM

BACKGROUND

Aspects of the disclosure relate to electrical computers, systems, and devices for triggering and executing real-time multi-computer data exchange. In particular, one or more aspects of the disclosure relate to real-time, dynamic data exchange and control functions.

Enhanced connectivity between communication devices, possible with advancing communication protocols, such as fifth generation (5G) cellular network technology, may be leveraged for providing improved customization of outputs for users. Real-time dynamic data exchange may be performed based on user location to generate one or more customized outputs for a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing real-time, customized outputs for a user.

In some examples, user device location data may be detected. The location data may be detected in real-time and one or more entities within a predefined proximity of the detected location may be identified. In some examples, a communication session may be established with a first entity of the one or more entities identified. A request for a first offer may be transmitted to the first entity. In response, a first offer may be received from the first entity and evaluated to determine whether it is an optimized offer. If so, the offer may be presented to the user. If not, a counter offer may be generated using machine learning. The counter offer may be transmitted to the first entity for evaluation and acceptance or generation of another counter offer. Upon agreeing to a particular offer, the offer may be transmitted to the user device. Accordingly, real-time negotiation of a customized offer may be performed between a user representative system and an entity representative system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
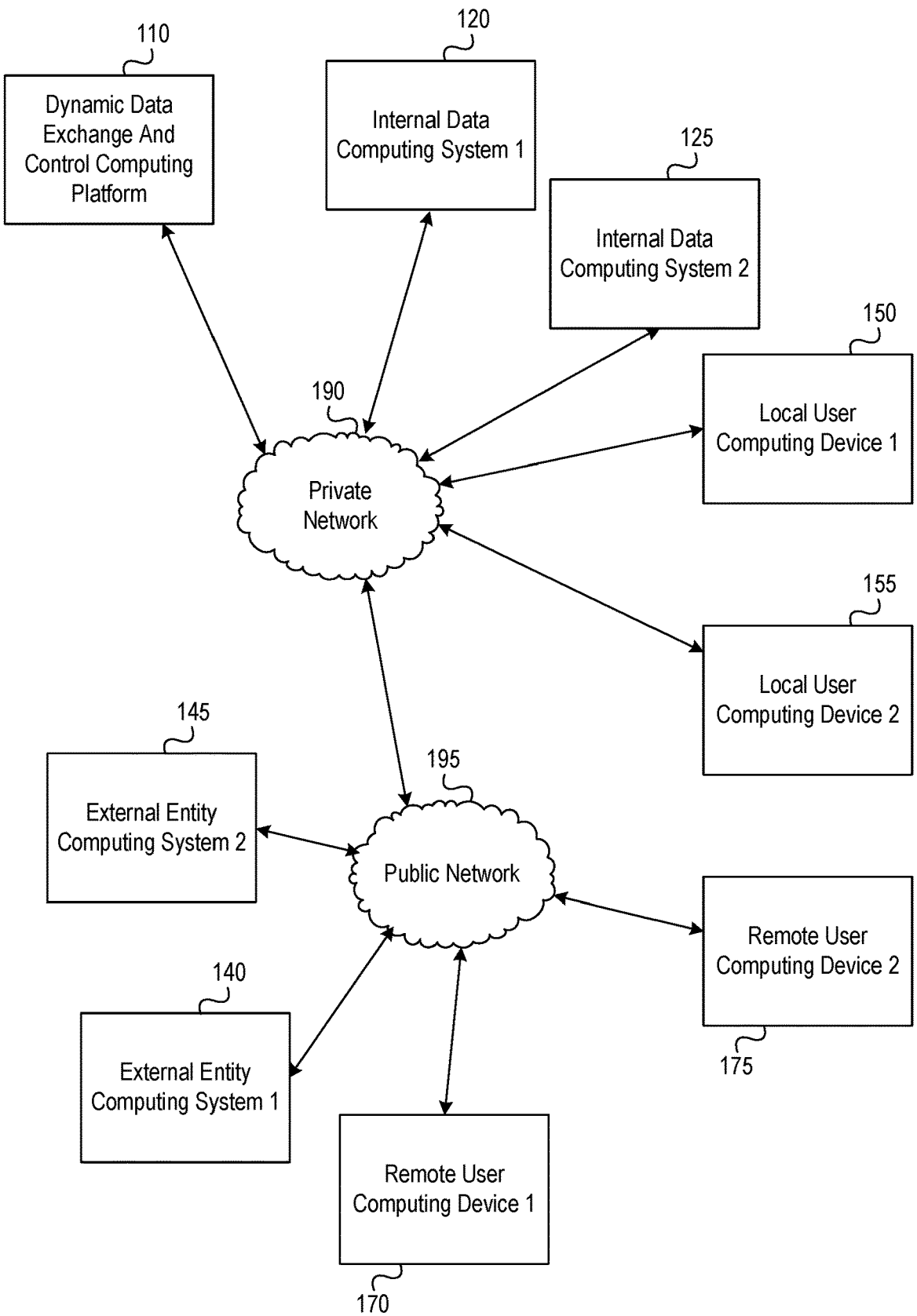
FIGS. 1A and 1B depict an illustrative computing environment for implementing dynamic data exchange and control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic data exchange and control. As discussed above, improving communication protocols may enable more efficient exchange of information to provide more customized service offerings to users.

As discussed more fully herein, 5G technologies may be leveraged to provide enhanced, real-time services for users. Introduction of 5G technologies is expected to significantly improve data throughput of wireless systems. One or more of computer systems, communication devices, and networked devices described herein may utilize 5G technologies for transmission and reception of data. The use of 5G technologies may ensure secure transmission of data from multiple devices (e.g., entity devices, user devices, and the like) with lower probability of network congestion.

Aspects described herein are directed to leveraging 5G technologies to enhance customized offers for a user. In some examples, a location of a user device may be detected. Based on the detected location, one or more entities within a predefined proximity of the location may be identified. In some examples, a communication session may be initiated with a computing system of a first entity of the one or more identified entities and a request for a first offer may be transmitted to the first entity computing system. In some examples, the request for a first offer may include user information enabling the entity to generate a customized offer for a user.

In response to the request for the first offer, a first offer may be received and analyzed. In some examples, machine learning may be used to analyze the first offer to determine whether it is an optimized offer. If so, the offer may be transmitted to a user device for consideration by the user. If not, a counter offer may be generated and transmitted to the first entity computing system. In response to transmission of the counter offer, counter offer response data may be received from the first entity computing system. The counter offer response data may include acceptance of the counter offer or a third or subsequent counter offer. Any received offer may be considered and, if an optimized offer, may be transmitted to the user device. Accordingly, a system representing the user's interests and a system representing the entity's interests may negotiate, in real-time, to identify an optimized, customized offer for presentation to the user.

These and various other arrangements will be discussed more fully below.

Figure 1B:
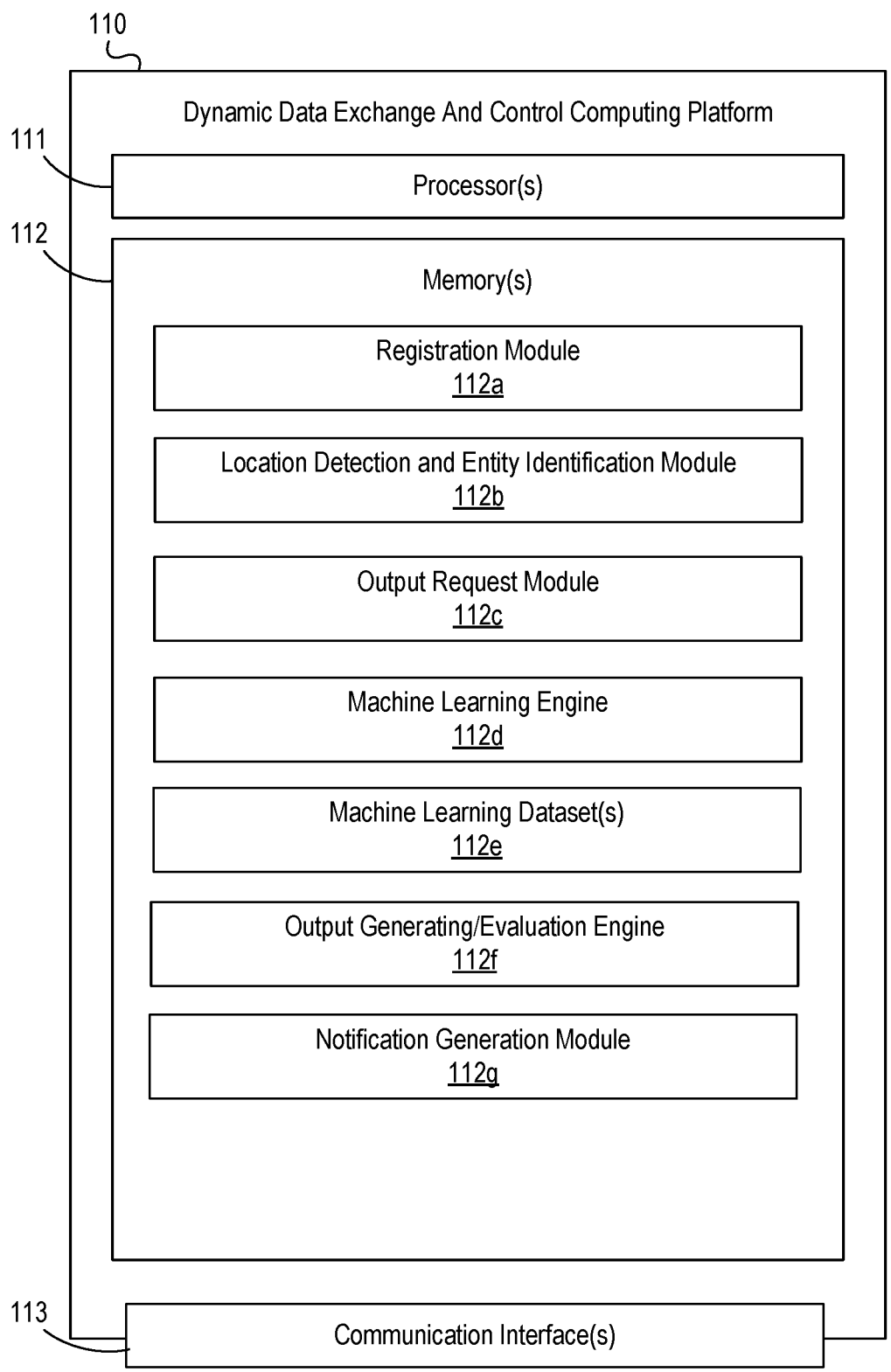

FIGS. 1A and 1B depict an illustrative computing environment for implementing and using a system for generating an output in real-time using dynamic data exchange in accordance with one or more aspects described herein. Referring to FIG. 1A, computing environment 100 may include one or more computing devices and/or other computing systems. For example, computing environment 100 may include dynamic data exchange and control computing platform 110, a first internal data computing system 120, a second internal data computing system 125, a first external entity computing system 140, a second external entity computing system 145, a first local user computing device 150, a second local user computing device 155, a first remote user computing device 170, and a second remote user computing device 175. Although two internal data computing systems and external entity computing systems are shown in FIG. 1A, more or fewer computing systems may be used without departing from the invention.

Dynamic data exchange and control computing platform 110 may be configured to provide intelligent, dynamic data exchange to generate one or more offers or outputs. For instance, dynamic data exchange and control computing platform 110 may include a digital agent acting on behalf of a user. In some examples, the dynamic data exchange and control computing platform 110 may be part of or in communication with or connected to a remote user computing device 170, 175, such as a smartphone, tablet computing device, wearable device, or the like. As a user moves about throughout a day, the dynamic data exchange and control computing platform 110 may, via the digital agent, receive location information associated with the remote user computing device 170, 175, scan for entity computing devices (e.g., external entity computing system 140, external entity computing system 145, or the like) within a predefined proximity of the received location and initiate communication with the entity systems. Once a handshake process is complete to initiate communication, the dynamic data exchange and control computing platform 110 may transmit a request for an offer or output to the entity system (e.g., external entity computing system 140, external entity computing system 145, or the like).

In some examples, transmitting the request for an offer or output may include transmitting user data. For instance, user data may be retrieved from one or more databases in dynamic data exchange and control computing platform 110, from one or more internal data computing systems (e.g., internal data computing system 120, internal data computing system 125, or the like). In some examples, the dynamic data exchange and control computing platform 110 may receive user data associated with user preferences, likes, dislikes, previous purchase data, user behaviors, and the like. In some arrangements, all or a portion of this data (e.g., less than all user data or a subset of the user data) may be transmitted with the request for an offer or output. Accordingly, upon receiving the request for offer or output, the external entity computing system 140, 145 may analyze the data to generate an intelligent offer or output which may then be transmitted to the dynamic data exchange and control computing platform 110.

Upon receiving the first offer or output from the external entity computing system 140, 145, the dynamic data exchange and control computing platform 110 may further analyze the offer based on the user data (e.g., all user data available). In some examples, machine learning may be used to analyze the data and the offer to generate a second offer or output. The second offer or output may be a counteroffer proposed to the external entity computing system 140, 145 and may be generated based on user data, likelihood of acceptance by the user, and the like. The second offer or output may be transmitted to the external entity computing system 140, 145 for further analysis. If the second offer or output is acceptable to the external entity, a notification may be transmitted to the dynamic data exchange and control computing platform 110. Alternatively, a third or subsequent offer may be generated (e.g., a further counteroffer). This subsequent offer may be transmitted to the dynamic data exchange and control computing platform 110 for analysis and evaluation.

The process may continue until both systems agree to an offer or output which may then be transmitted to remote user computing device 170, 175 for display to the user. The remote user computing device 170, 175 may receive user response data accepting or rejecting the offer and this data may be used to update and/or validate one or more machine learning datasets.

As discussed herein, the arrangements described and processes performed may be performed in real-time or near real-time and may be performed in a background of a device (e.g., remote user computing device 170, 175). Accordingly, offers or outputs may be generated that are customized to the user in rapid fashion in order to present the offer while the user is within a predefined proximity of the entity making the offer (e.g., within 50 feet, 100 feet, 100 yards, ½ mile, or the like). The request for an offer may be generated passively (e.g., based on user data or machine learning analysis of user data to identify offers that may be appealing to a user) or may be actively requested by a user (e.g., user preferences may be predetermined to establish pre-set rules such as, "anytime I am within 100 yards of this particular coffee shop please generate an offer," and/or "I am shopping for a carpet. Please alert me with an offer when I am close to a carpet store.").

In some examples, the system may identify a best or optimized offer for the user. For instance, based on machine learning analysis of user data, an optimized offer may be determined. If that optimized offer or output is received from the entity, the dynamic data exchange and control computing platform 110 will transmit the offer to the user device for display and acceptance or rejection. Additionally or alternatively, a best or optimized offer may be determined based on predetermined rules provided by a user. For instance, a user may indicate that anytime a particular sandwich shop will give at least $1.00 off a sandwich he or she will accept the offer. This may then be deemed a best or optimized offer for that entity (e.g., sandwich shop) and if that offer is received (e.g., either as a first offer or based on one or more counteroffers) it will be transmitted to the user for acceptance or rejection.

External entity computing system 140 and external entity computing system 145 may be any suitable computing system for communicating with dynamic data exchange and control computing platform 110, generating an offer, evaluating a counter offer, and the like. For instance, external entity computing system 140 and external entity computing system 145 may include one or more desktop computers, laptop computers, servers, or the like. In some examples, external entity computing system 140 and external entity computing system 145 may be owned by, operated by and/or associated with an entity other than the entity implementing the dynamic data exchange and control computing platform 110. For instance, external entity computing system 140, external entity computing system 145, and the like, may be owned by, operated by and/or associated with a vendor, service provider, or the like, that may generate an offer to be provided to the user. In some examples, one or more of external entity computing system 140 and external entity computing system 145 may be operated by the entity operating the dynamic data exchange and control computing platform 110.

Internal data computing system 120 and internal data computing system 125 may be computing systems associated with (e.g., operated by, owned by, or the like) the entity implementing the dynamic data exchange and control computing platform 110. Internal data computing system 120, internal data computing system 125, and the like, may include one or more desktop computers, laptop computers, servers, and the like. In some examples, internal data computing system 120 and/or internal data computing system 125 may store data associated with one or more customers or users of the entity implementing the dynamic data exchange and control computing platform 110. For instance, internal data computing system 120 and/or internal data computing system 125 may store data associated with one or more customers, such as user identifying data, purchase history data, user contact data, user account data, user profile data, user behavior data, and the like. The user data may be captured, stored, transmitted, analyzed and the like with permission of the user.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the dynamic data exchange and control computing platform 110 to control parameters of the system, update or execute rules, modify settings, display notifications, and the like.

The remote user computing devices 170, 175 may be used to communicate with, for example, dynamic data exchange and control computing platform 110. For instance, remote user computing devices 170, 175 may include user computing devices, such as mobile devices including smartphones, tablets, laptop computers, and the like, that may enable or permit a user to communicate with dynamic data exchange and control computing platform 110 to input user preferences, detect and/or transmit location information, receive and display notifications of offers or outputs, receive user input include user response data responsive to an offer or output, and the like.

In one or more arrangements, internal data computing system 120, internal data computing system 125, external entity computing system 140, external entity computing system 145, local user computing device 150, local user computing device 155, remote user computing device 170, and/or remote user computing device 175 may be any type of computing device or combination of devices configured to perform the particular functions described herein. For example, internal data computing system 120, internal data computing system 125, external entity computing system 140, external entity computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing system 120, internal data computing system 125, external entity computing system 140, external entity computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic data exchange and control computing platform 110. As illustrated in greater detail below, dynamic data exchange and control computing platform 110 may include one or more computing devices configured to perform one or more of the functions described herein. For example, dynamic data exchange and control computing platform 110 may include one or more computers (e.g., laptop computers, desktop computers, servers, server blades, or the like).

As mentioned above, computing environment 100 also may include one or more networks, which may interconnect one or more of dynamic data exchange and control computing platform 110, internal data computing system 120, internal data computing system 125, external entity computing system 140, external entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic data exchange and control computing platform 110, internal data computing system 120, internal data computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic data exchange and control computing platform 110, internal data computing system 120, internal data computing system 125, local user computing device 150, local user computing device 155, and one or more other computing devices and/or computer systems that are used by, operated by, and/or otherwise associated with the organization. In examples in which one or more of external entity computing system 140, external entity computing system 145, or the like, are also associated with and/or operated by the organization, those devices may be connected or configured to be connected via private network 190 in at least some examples. Public network 195 may connect private network 190 and/or one or more computing devices connected thereto (e.g., dynamic data exchange and control computing platform 110, internal data computing system 120, internal data computing system 125, local user computing device 150, local user computing device 155) with one or more networks and/or computing devices that are not associated with the organization. For example, external entity computing system 140, external entity computing system 145, remote user computing device 170, remote user computing device 175, might not be associated with an organization that operates private network 190 (e.g., because external entity computing system 140, external entity computing system 145, remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, remote user computing device 175, to private network 190 and/or one or more computing devices connected thereto (e.g., dynamic data exchange and control computing platform 110, internal data computing system 120, internal data computing system 125, local user computing device 150, local user computing device 155).

Referring to FIG. 1B, dynamic data exchange and control computing platform 110 may include one or more processors 111, memory 112, and communication interface 113. A data bus may interconnect processor(s) 111, memory 112, and communication interface 113. Communication interface 113 may be a network interface configured to support communication between dynamic data exchange and control computing platform 110 and one or more networks (e.g., private network 190, public network 195, or the like). Memory 112 may include one or more program modules having instructions that when executed by processor(s) 111 cause dynamic data exchange and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic data exchange and control computing platform 110 and/or by different computing devices that may form and/or otherwise make up dynamic data exchange and control computing platform 110.

For example, memory 112 may have, store and/or include a registration module 112a. Registration module 112a may store instructions and/or data that may cause or enable the dynamic data exchange and control computing platform 110 to receive registration information for one or more users. For instance, individual users may register with the system and provide user information, such as name, contact information, account information, and the like. In some examples, a user may provide user preferences, predetermine rules for generating and/or displaying offers, provide permissions for data capture and use, preferred or desired entities for generating offers, and the like.

The registration data may be received by the registration module 112a and a registration record may be generated. The registration record may be generated in a data structure and adding the record may modify the data structure. The registration information may then be stored and may be used to generate an offer, evaluate an offer or counter offer, identify a best or optimized offer, and the like.

Dynamic data exchange and control computing platform 110 may further have, store and/or include a location detection and entity identification module 112b. Location detection and entity identification module 112b may store instructions and/or data that may cause or enable the dynamic data exchange and control computing platform 110 to request location data from a user device, such as remote user computing device 170, remote user computing device 175, or the like. In some examples, location data may be requested at predetermined intervals, upon receiving indication of movement of the user device, or the like. In some arrangements, location data may be continuously received from the user device such that a location of the user device may be known in real-time and offers or outputs may be generated efficiently and in real-time ore near real-time. The location data may be captured by a global positioning system (GPS) on the user device in some examples.

Location detection and entity identification module 112b may further store instructions and/or data that may cause or enable the dynamic data exchange and control computing platform 110 to, based on received location data, identify one or more entities within a predefined proximity of the location indicated in the location data (e.g., based on global positioning system data, longitude and latitude, and the like). In some examples, the predefined proximity may be customizable by the user (e.g., 50 feet, 100 feet, 100 yards, or the like). In other examples, a default proximity may be used. After identifying the one or more entities, the dynamic data exchange and control computing platform 110 may initiate communication with external systems at one or more of the one or more entities (e.g., external entity computing system 140, external entity computing system 145, or the like) in order to request an offer, evaluate an offer received, and the like.

Dynamic data exchange and control computing platform 110 may further have, store and/or include output request module 112c. Output request module 112c may store instructions and/or data that may cause or enable the dynamic data exchange and control computing platform 110 to receive and/or extract user data and generate a request for an offer or output. For instance, user data, such as user behavior data, purchase history data, and the like, may be requested, received and/or extracted (e.g., from internal data computing device 120, internal data computing device 125, registration module 112a, or the like). A request for an entity (e.g., one or more of the one or more identified entities within proximity of the user device) to generate an offer or output may be generated. In some examples, the request may include a portion (e.g., less than all of the user data) of the user data (e.g., to avoid transmitting more user data than necessary). In some examples, user data may be anonymized prior to transmission. Further, in some arrangements, all user data may be transmitted with the request.

In some examples, the request may include a request for a particular offer or output, type of offer or output, or the like. Additionally or alternatively, in some arrangements, the request may include predetermined rules or parameters (e.g. minimum requests, or the like).

The generated output or offer may then be transmitted to the one or more of the one or more identified entities within proximity of the user device. In response to the request, a first offer or output may be generated by an entity system (e.g., external entity computing system 140, 145) and transmitted to the dynamic data exchange and control computing platform 110. The first offer may be received by the dynamic data exchange and control computing platform 110 and evaluated to determine whether the offer is a best or optimized offer.

For instance, the first offer may be analyzed with, in at least some examples, all user data, to determine whether the offer is a best or optimized offer or whether a second or counter offer should be generated. In some examples, machine learning may be used to evaluate the first offer with the user data to determine whether it is a best or optimized offer, whether to generate a second or other counter offer, to generate the second or counter offer, and the like. Accordingly, dynamic data exchange and control computing platform 110 may have, store and/or include a machine learning engine 112*d* and machine learning datasets 112*e*. Machine learning engine 112*d* and machine learning datasets 112*e* may store instructions and/or data that may cause or enable dynamic data exchange and control computing platform 110 to evaluate a received first (or other subsequent offer received from an entity device) with user data to determine whether the offer is optimized, to generate a counter offer, or the like. For instance, the machine learning engine 112*d* may determine whether an offer is optimized (e.g., based on predetermined rules, likelihood of acceptance, or the like) and provide the determination to the dynamic data exchange and control computing platform 110. Further, machine learning engine 112*d* may, if an offer is not optimized, generate a second or counter offer for transmission to the entity device. The machine learning datasets 112*e* may be generated based on analyzed data (e.g., data from previously received data, and the like), raw data, and/or received from one or more outside sources.

The machine learning engine 112*d* may receive data related to one or more users, offers or outputs, and the like, and, using one or more machine learning algorithms, may generate one or more machine learning datasets 112*e*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112*d* may analyze data to identify patterns of activity, sequences of activity, and the like, to generate one or more machine learning datasets 112*e*.

In some examples, the machine learning datasets 112*e* may include machine learning data linking one or more user behaviors, purchases, or the like, to an offer, type of offer, amount of offer, or the like to a likelihood that the offer will be accepted by the user. Accordingly, the machine learning datasets 112*e* may be used to evaluate an offer to determine whether it is optimized and/or generate a more optimal offer for consideration by the entity computing system.

Based on the generated machine learning datasets 112*e*, output generating/evaluation engine 112*f* may evaluate a notification regarding whether the offer is optimized, generate a counter offer based on machine learning, or the like. Further, the output generating/evaluation engine 112*f* may, based on machine learning input received, may determine whether to transmit an offer to the user and cause the offer to display on the user device (e.g., remote user computing device 170, 175).

Upon determining that an offer should be transmitted to the user device, notification generation module 112*g* may receive an instruction or command to generate a notification including a particular offer (e.g., an optimized offer, an offer meeting predetermined rules, a best offer received from the entity, or the like). The notification generation module 112*g* may store instructions and/or data that may cause or enable the dynamic data exchange and control computing platform 110 to generate a notification including an identified offer, transmit the offer to the remote user computing device 170, 175, and cause the notification to be displayed. In some examples, user response data accepting or rejecting the offer and input into the user interface provided via the notification may be received by the notification generation module 112*g* and used to validate and/or update one or more machine learning datasets, as well as to cause display of a coupon, machine readable code, or other device, update an online payment application, or the like, used to redeem the offer.

FIGS. 2A-2F depict one example illustrative event sequence for implementing and using dynamic data exchange and control functions in accordance with one or more aspects described herein. The events shown in the illustrative event sequence are merely one example sequence and additional events may be added, or events may be omitted, without departing from the invention.

Figure 2A:
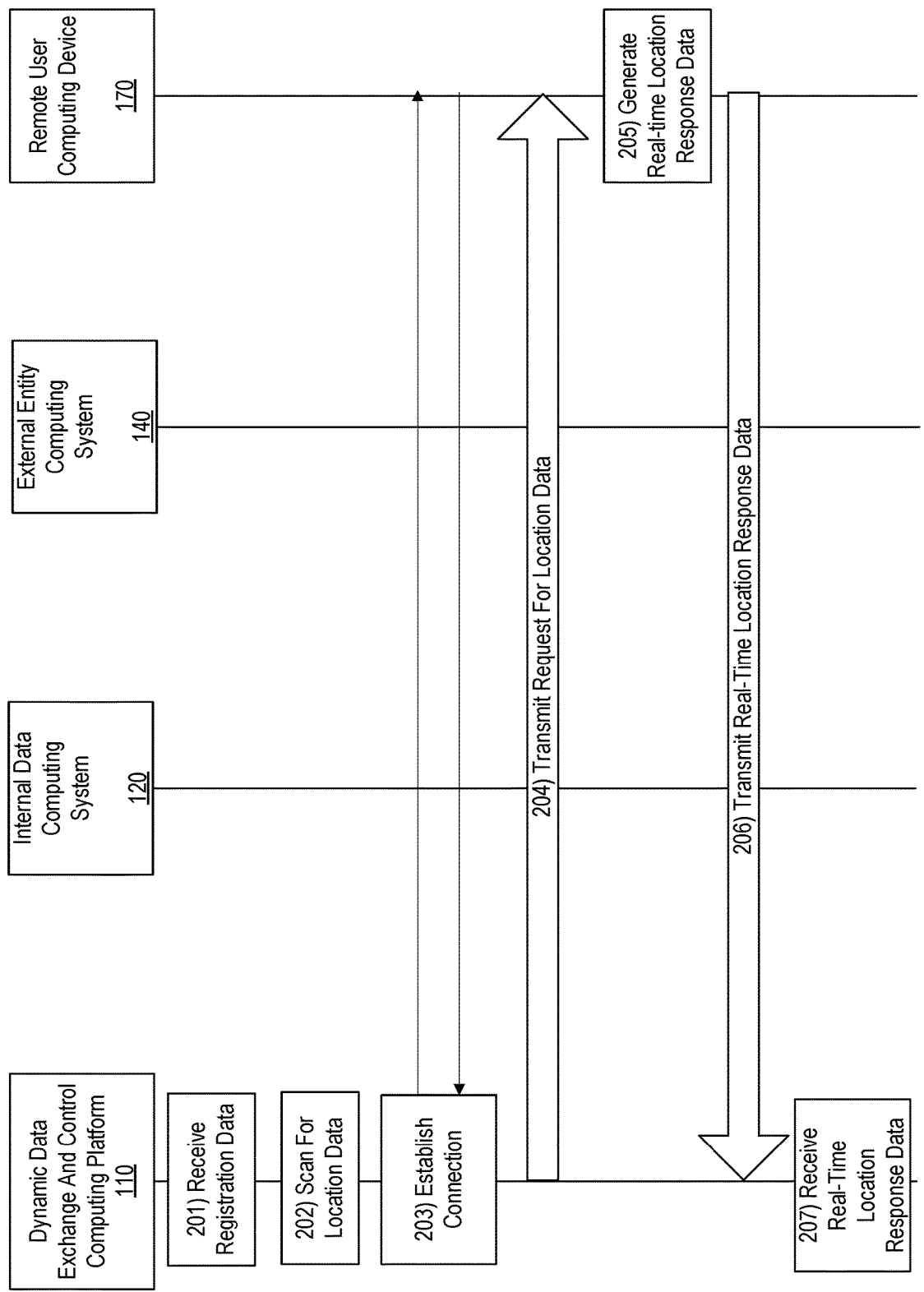
FIGS. 2A-2F depict an illustrative event sequence for implementing dynamic data exchange and control functions in accordance with one or more aspects described herein.

Referring to FIG. 2A, at step 201, registration data may be received. In some examples, registration data may include receiving user data associated with one or more users or customers of an entity implementing the dynamic data exchange and control computing platform 110. For instance, any user or customer who desires to be presented with customized offers based on, for example, real-time location data, may register. In some examples, registration data may include user identifying data, user account data, user device data (e.g., identifying information), user preferences, user permissions, and the like.

At step 202, current location data may be requested. For instance, in some examples, the dynamic data exchange and control computing platform 110 may scan (e.g., continuously, at predetermined intervals, or the like) for location data associated with a registered user device, such as remote user computing device 170. In some examples, scanning for location data may include communicating with the remote user computing device 170 and requesting current, real-time location data (e.g., based on GPS data).

At step 203, a connection may be established between the dynamic data exchange and control computing platform 110 and remote user computing device 170. For instance, a first wireless connection may be established between the remote user computing device 170 and the dynamic data exchange and control computing platform 110. Upon establishing the first wireless connection, a communication session may be initiated between the remote user computing device 170 and the dynamic data exchange and control computing platform 110.

In arrangements in which one or more aspects of the processes described with respect to the dynamic data exchange and control computing platform 110 are performed by remote user computing device 170 (e.g., via an application executing on remote user computing device), the first wireless connection might be optional.

At step 204, a request for location data may be transmitted from the dynamic data exchange and control computing platform 110 to the remote user computing device 170. At step 205, the request may be received by the remote user computing device and real-time location response data may be generated. In some examples, the real-time location response data may include GPS or other location data captured by one or more sensors, systems, or other devices on the remote user computing device 170.

At step 206, the generated location response data may be transmitted from the remote user computing device 170 to the dynamic data exchange and control computing platform 110. At step 207, the location response data may be received by the dynamic data exchange and control computing platform 110.

Figure 2B:
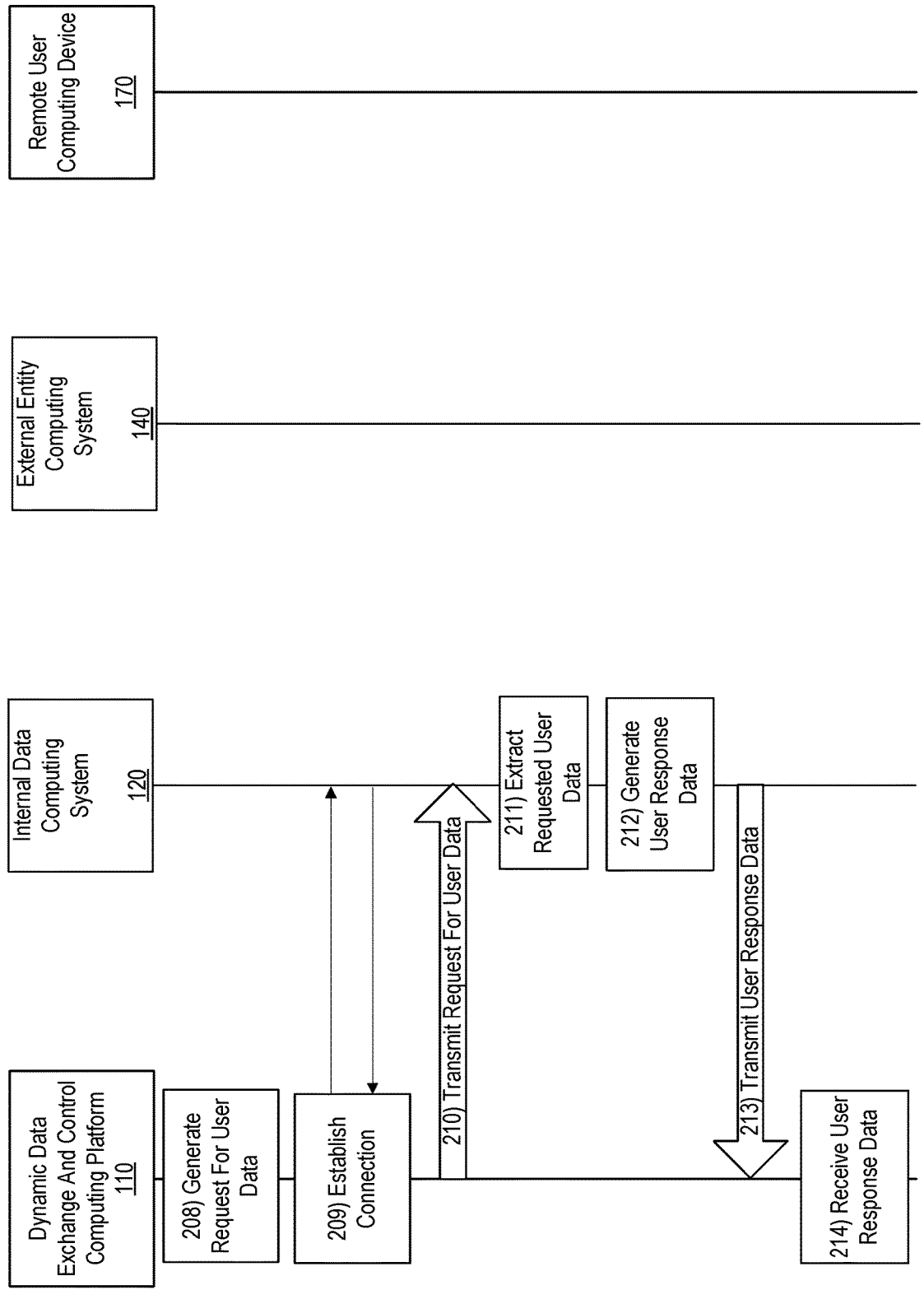

With reference to FIG. 2B, at step 208, a request for user data may be generated. For instance, a request for user data may be generated by the dynamic data exchange and control computing platform 110. In some examples, the request for user data may include information identifying a user, one or more user devices, or the like. The requested user data may include user purchase history data, user device usage data, user behavior data, user preference data, and the like.

At step 209, a connection may be established between the dynamic data exchange and control computing platform 110 and one or more internal data computing systems, such as internal data computing system 120, internal data computing system 125, and the like. For instance, a second wireless connection may be established between the internal data computing system 120 and the dynamic data exchange and control computing platform 110. Upon establishing the second wireless connection, a communication session may be initiated between the internal data computing system 120 and the dynamic data exchange and control computing platform 110. Although a connection to internal data computing system 120 is shown, connections to additional internal data computing systems, such as system 125, may also be established without departing from the invention.

At step 210, the generated request for user data may be transmitted from the dynamic data exchange and control computing platform 110 to the internal data computing system 120. At step 211, the requested user data may be extracted from one or more data stores or other systems or devices associated with the internal data computing system 120 and, at step 212, user response data may be generated. The user response data may include the extracted user data.

At step 213, the user response data may be transmitted from the internal data computing system 120 to the dynamic data exchange and control computing platform 110. At step 214, the user response data may be received by the dynamic data exchange and control computing platform 110.

Figure 2C:
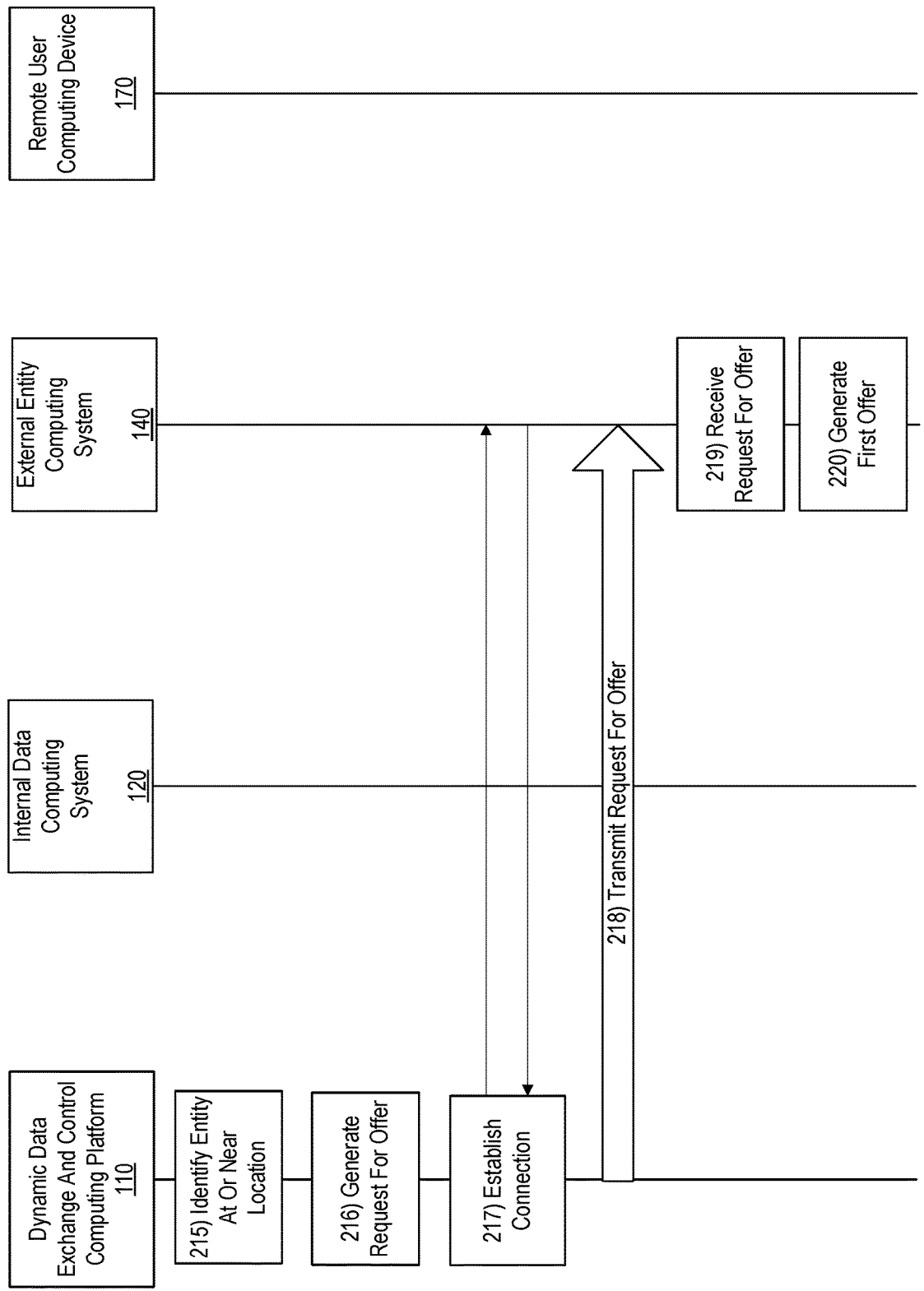

With reference to FIG. 2C, at step 215, based on the received location response data, one or more entities within a predefined proximity of the location of the user (e.g., location of remote user computing device 170) may be identified. In some examples, the one or more entities may be entities within a specified distance (either radial distance or linear distance) (e.g., 100 yards, ½ mile, 1 mile, or the like). Additionally or alternatively, the proximity may be adjusted based on a determined speed of movement of a user. For instance, based on recent location data, an estimate of speed of movement of the remote user computing device may be determined. The speed may then be used to determine a predefined proximity in which to identified entities. For instance, if a user is moving in a vehicle at 30 mph, a greater distance (e.g., 1 mile, 2 miles, or the like) may be considered when identifying entities than when a user is walking at 3 mph (e.g., distances of 100 yards, 1000 feet, ½ mile, or the like, may be used).

In some examples, the identified entities may include all entities within the predefined distance. Additionally or alternatively, the identified entities may include entities matching one or more user preferences or predefined rules.

At step 216, a request for an offer may be generated by the dynamic data exchange and control computing platform 110. For instance, a request for one or more of the one or more identified entities to generate an offer for a user may be generated. In some examples, the request may include some or all of the user data (e.g., user response data received at step 214). This user data transmitted with the request may be used by an entity computing system (e.g., external entity computing system 140, 145) to generate a customized offer for the user. Providing less than all of the user data may aid in ensuring privacy of the user's data.

At step 217, a connection may be established between the dynamic data exchange and control computing platform 110 and one or more external entity computing systems, such as external entity computing system 140, external entity computing system 145, and the like. For instance, a third wireless connection may be established between the external entity computing system 140 and the dynamic data exchange and control computing platform 110. Upon establishing the third wireless connection, a communication session may be initiated between the external entity computing system 140 and the dynamic data exchange and control computing platform 110. Although a connection to external entity computing system 140 is shown, connections to additional external entity computing systems, such as system 145, may also be established (either in series or parallel) without departing from the invention.

At step 218, the request for offer may be transmitted from the dynamic data exchange and control computing platform 110 to the external entity computing system 140. At step 219, the request for offer may be received by the external entity computing system 140 and may be processed to generate a first offer at step 220. In some examples, the first offer may be customized to the user based on the portion (or, in some examples, all) user data received with the request for offer. For instance, user preferences may be transmitted with the offer and those preferences may be used to generate a customized first offer for the user.

Figure 2D:
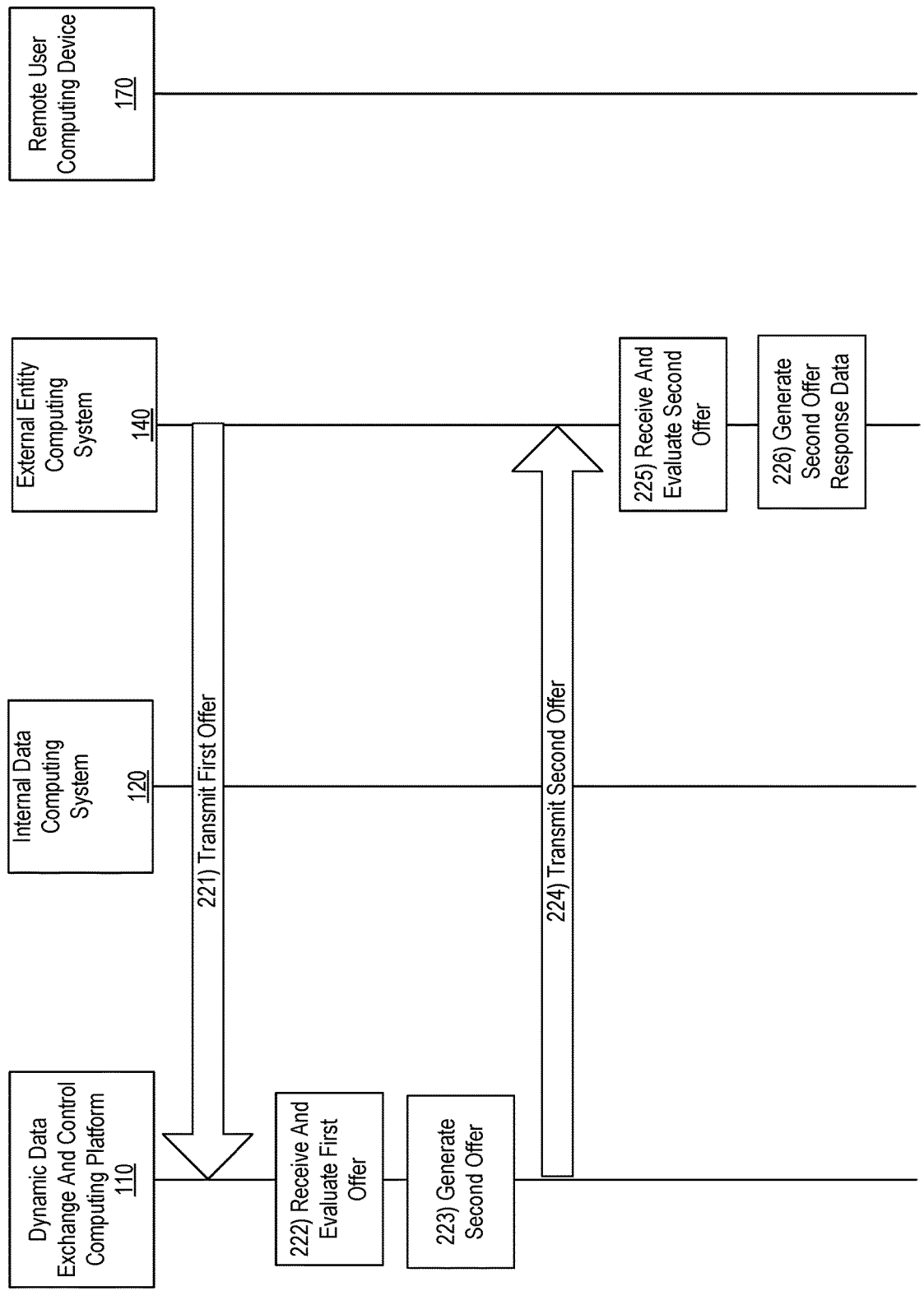
Figure 2E:
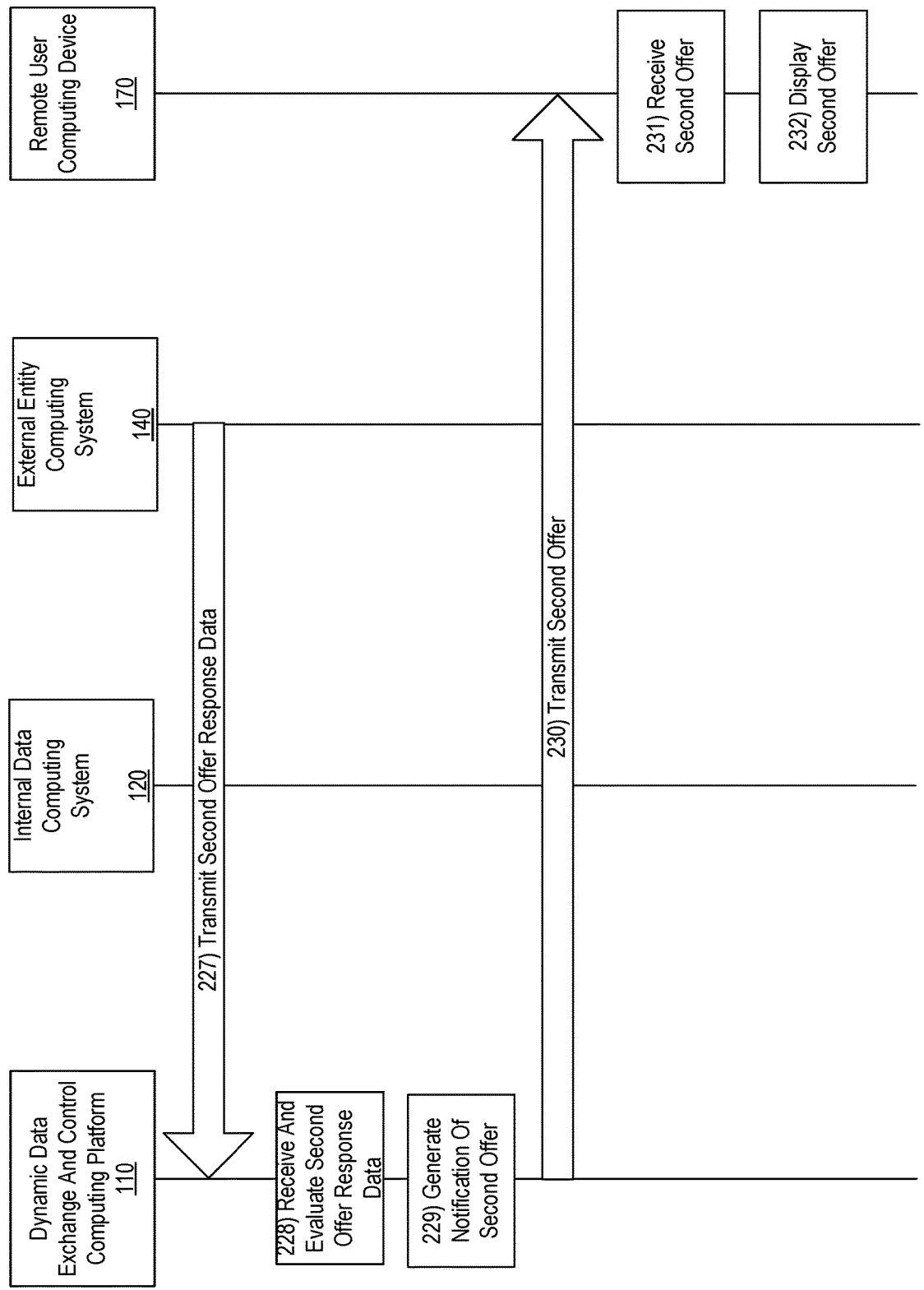

With reference to FIG. 2D, at step 221, the first offer may be transmitted from the external entity computing system 140 to the dynamic data exchange and control computing platform 110. At step 222, the first offer may be received and evaluated by the dynamic data exchange and control computing platform 110. For instance, the first offer may be evaluated compared with user data (e.g., all user data rather than just a portion) and, in some examples, using machine learning. The first offer may be evaluated to determine whether it is likely to be accepted (e.g., based on predefined rules, user preferences, machine learning analysis, or the like), whether it is a best or optimized offer, or the like.

Based on the evaluation of the first offer, a determination may be made as to whether the offer will be presented to the user (e.g., transmitted to a user device and displayed on the device) or whether a second or counter offer will be generated. If the offer will be presented to the user, it may be transmitted to the device for display on the device, as will be discussed more fully herein. If a second or counter offer will be generated, at step 223, the second or counter offer may be generated. In some examples, the second or counter offer may use the first offer as a base offer and may adjust one or more parameters of the first offer based on user data, predetermined rules, machine learning, likelihood of acceptance, or the like. The second or counter offer may be generated from scratch and might not be based on the first offer, in some examples.

At step 224, the second or counter offer may be transmitted from the dynamic data exchange and control computing platform 110 to the external entity computing system 140. At step 225, the second or counter offer may be received and evaluated by the external entity computing system 140. In some examples, evaluating the second or counter offer may include comparing the second or counter off to one or more offer parameters acceptable to the entity evaluating (e.g., making) the offer.

Based on the evaluation of the second or counter offer, second offer response data may be generated at step 226. The second offer response data may include an indication that the second or counter offer is accepted by the entity and should be presented to the user or may include a third or subsequent counter offer. In the case of a third or subsequent counter offer, it may be transmitted to the dynamic data exchange and control computing platform 110 for evaluation and acceptance (e.g., presentation to the user) or an additional counter offer may be generated and transmitted to the entity system 140.

In the example of FIGS. 2A-2F, the second offer response data may include acceptance, by the entity, of the second or counter offer. Accordingly, with reference to FIG. 2E, at step 227, the second offer response data may be transmitted from the external entity computing system 140 to the dynamic data exchange and control computing platform 110. At step 228, the second offer response data may be received by the dynamic data exchange and control computing platform 110 and may be evaluated to determine whether the entity has accepted the second or counter offer or has provided a third or subsequent counter offer.

As mentioned above, the instant example includes second offer response data indicating acceptance of the second or counter offer. Accordingly, at step 229, a notification including the generated second offer may be generated. The notification may include a user interface including the second offer and including selectable options for the user to accept or reject the offer.

At step 230, the second offer may be transmitted from the dynamic data exchange and control computing platform 110 to the user device, such as remote user computing device 170. At step 231, the second offer may be received by the remote user computing device 170 and displayed on a display of the remote user computing device 170 at step 232.

Figure 2F:
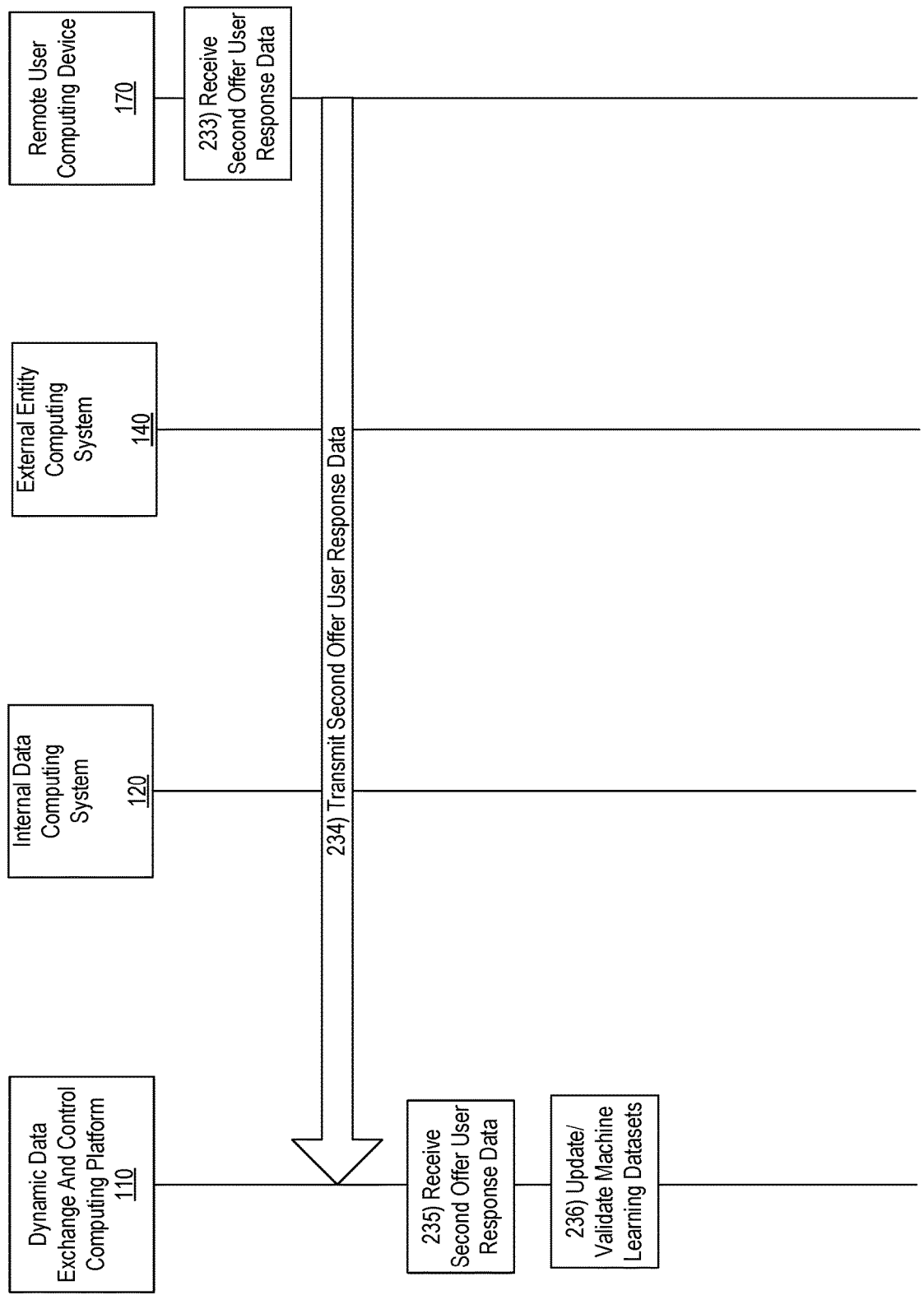

With reference to FIG. 2F, at step 233, second offer user response data may be received by the remote user computing device 170. For instance, the user may provide user input selecting an option to accept the second offer or reject the second offer. This user input may be used to generate the second offer user response data.

At step 234, the second offer user response data may be transmitted to the dynamic data exchange and control computing platform 110. At step 235, the second offer user response data may be received and analyzed. In some examples, analyzing the second offer user response data may be include determining whether the second offer user response data includes acceptance or rejection of the second offer, enabling and/or transmitting one or more devices for redeeming the offer (e.g., machine readable codes, coupons, electronic payment coupons, or the like), and the like.

At step 236, based on the received second offer user response data, one or more machine learning datasets may be updated and/or validated. Accordingly, the system may continue learning user preferences, and the like, in order to further customize offers for a particular user.

Figure 3A:
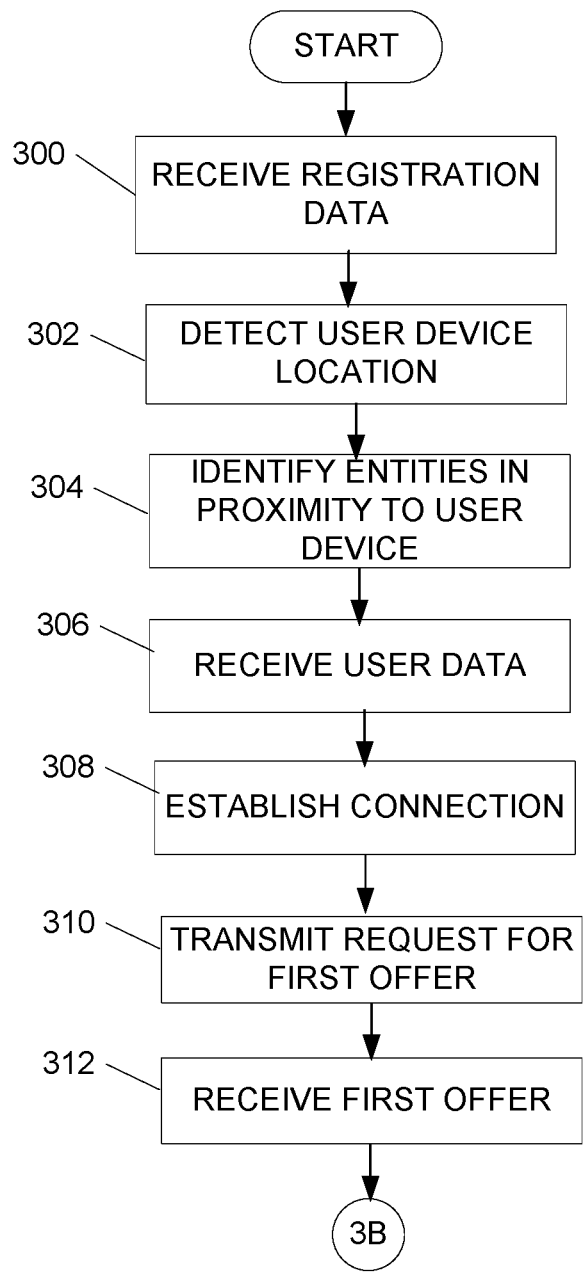
FIGS. 3A and 3B depict an illustrative method for implementing and using dynamic data exchange and control functions according to one or more aspects described herein.
Figure 3B:
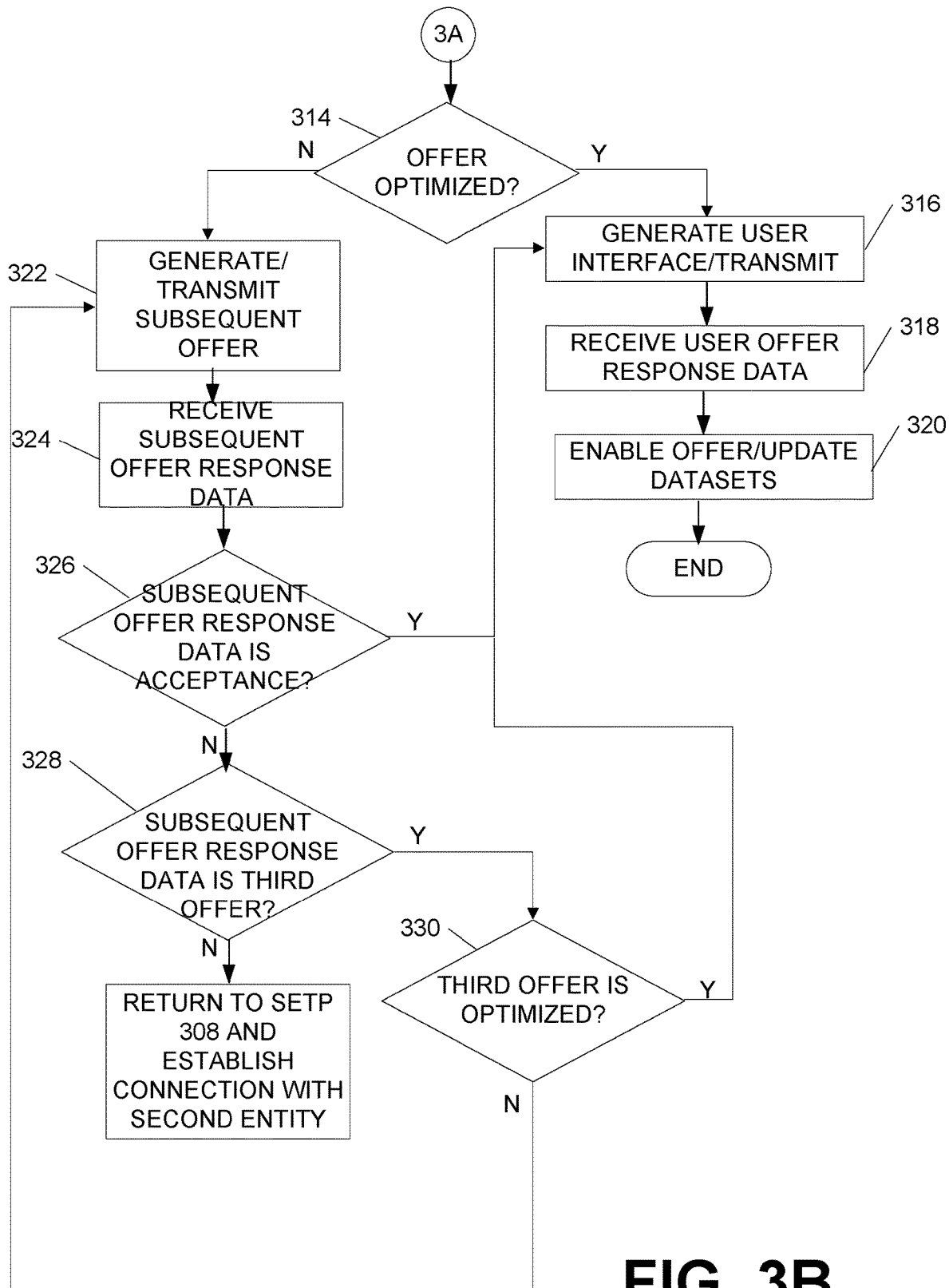

FIGS. 3A and 3B are a flow chart illustrating one example method of dynamic data exchange and control according to one or more aspects described herein. The processes illustrated in FIGS. 3A and 3B are merely some example processes and functions. The steps shown may be performed in the order shown, in a different order, more steps may be added, or one or more steps may be omitted, without departing from the invention.

At step 300, registration data may be received from, for example, a user device such as a remote user computing device 170. The registration data may include user contact information, account information, user preferences, user profile data, user device identifying data, and the like.

At step 302, a user device location may be detected. In some examples, a continuous scan of user device location data may be performed to identify, in real-time, a location of the user device. Additionally or alternatively, periodic (e.g., at preset intervals, upon detecting a triggering event, or the like) scans of user location data may be performed. The user device location data may be captured by the user device using global navigation satellite system (GNSS), GPS, or the like.

At step 304, one or more entities (or a plurality of entities) within a predefined proximity of the detected location may be identified. The predefined proximity may be determined by the system, customized by the user, or the like. The identified one or more entities may be based on user preferences, predefined rules, or merely based on distance from the detected location (e.g., all entities within the predefined proximity).

At step 306, user data may be received. In some examples, user data may be received from one or more internal data computing devices owned, operated or associated with the entity implementing the dynamic data exchange and control computing platform 110. The user data may include user historical data (e.g., purchase history, offer acceptance history, and the like), user preferences, user behavior data, and the like.

At step 308, a connection may be established with computing device or system of a first entity of the one or more identified entities. In some examples, the connection may be established in real-time or near real-time in order to obtain an offer to present to the user while the user is within range of the entity.

At step 310, a request for a first offer may be generated by the dynamic data exchange and control computing platform 110 and transmitted to the first entity computing system via the established connection. In some examples, the request for the first offer may include some or all of the received user data in order to enable the first entity computing system to generate an offer customized to the user. At step 312, a first offer may be received from the first entity computing system.

With reference to FIG. 3B, at step 314, a determination may be made (e.g., by the dynamic data exchange and control computing platform 110) of whether the first offer is an optimized or best offer. In some examples, machine learning may be used to determine whether the offer is a best or optimized offer. In some examples, determining whether the offer is a best or optimized offer may be based on predefined rules or user preferences and may include determining a likelihood that the user will accept the offer.

If, at step 314, the first offer is an optimized offer, the dynamic data exchange and control computing platform 110 may determine to present the offer to the user and may generate a notification including a user interface presenting the offer to the user at step 316. The generated notification and user interface may be transmitted to the user device (e.g., remote user computing device 170) and may be displayed on the device. The user interface may include options for the user to accept the offer or reject the offer.

At step 318, user offer response data may be received. The user offer response data may include acceptance or rejection of the offer. At step 320, if the user response data includes acceptance of the offer, the offer may be enabled (e.g., stored in an electronic payment wallet, a coupon or machine readable code may be generated, or the like). Based on the received user response data, one or more machine learning datasets may be updated and/or validated based on the user response data at step 320.

If, at step 314, the first offer is not an optimized offer, at step 322, a subsequent or counter offer may be generated and transmitted to the first entity computing system. For instance, if the first offer is not considered optimized, the dynamic data exchange and control computing platform 110 may generate a counter offer that is an optimized offer, is closer to an optimized offer, or the like. The generated counter offer may be generated based on machine learning and may rely on all user data available.

At step 324, subsequent offer response data may be received from the first entity computing system. For instance, the first entity computing system may evaluate the second or subsequent counter offer made and may generate response data either accepting the counter offer or, in some examples, generating and providing another counter offer.

At step 326, the subsequent offer response data may be analyzed to determine whether the subsequent offer response data includes acceptance of the subsequent counter offer. If so, the process may move to step 316 where the offer may be presented to the user. If not, a determination may be made at step 328 as to whether the subsequent offer response data is a third or other counter offer (e.g., a counter offer from the first entity made in response to the counter offer made by the dynamic data exchange and control computing platform 110). If not, the request for offer may be deemed rejected by the first entity and the process may return to step 308 in FIG. 3A to establish a connection with another identified entity of the one or more identified entities to request a first offer and begin negotiation with that entity.

If, at step 328, it is determined that the subsequent offer response data includes a third or additional counter offer, at step 330 the received third or additional counter offer may be evaluated to determine whether it is an optimized offer. If so, the process may move to step 316 and the offer may be presented to the user. If not, the offer may return to step 322 where the dynamic data exchange and control computing platform 110 may generate yet another counter offer and continue through the process until an offer agreement is reached or offers are rejected.

Accordingly, the arrangements described with respect to FIGS. 3A and 3B illustrate a negotiation between a user system or system representing a user and an entity system to generate customized offers for a user that are optimized based on user behaviors, preferences, predefined rules, or the like.

Figure 4:
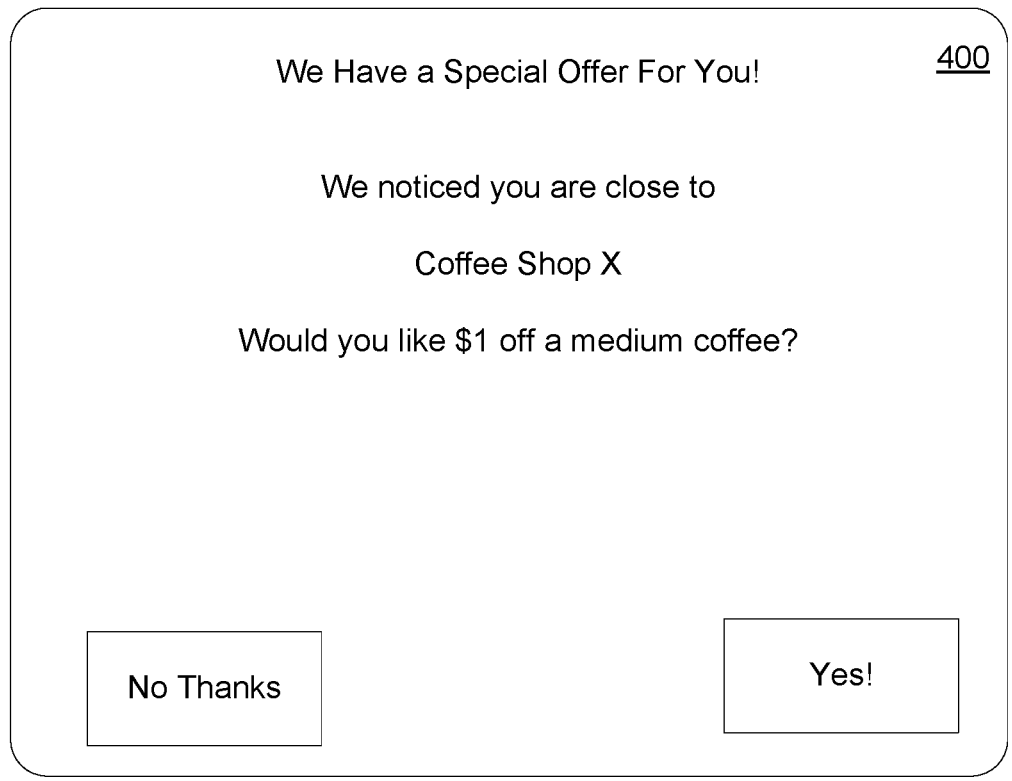
FIG. 4 illustrates one example user interface for use with dynamic data exchange and control functions according to one or more aspects described herein.

FIG. 4 illustrates one example notification that may be generated and transmitted to a user device in accordance with one or more aspects described herein. FIG. 4 includes a user interface 400 that includes presentation of the offer to the user (e.g., $1.00 off a medium coffee at Coffee Shop X). The user interface also includes an option to accept the offer to reject it. Accordingly, acceptance or rejection of the offer may constitute user response data that may be used to enable the offer, update/validate machine learning datasets, and the like.

Aspects described herein are directed to leveraging 5G technologies to provide, in real-time, enhanced, customized user offers. Accordingly, transmission or receipt of data described with respect to the arrangements discussed herein (e.g., in the event sequence of FIGS. 2A-2F, the flow chart of FIGS. 3A and 3B, or the like) may be performed using 5G communication standards over, for example, one or more wireless networks.

5G standards allow a higher throughput than prior wireless cellular technologies that use $4^{th}$ generation (4G) standards, $3^{rd}$ generation (3G) standards, and the like. A higher throughput may allow a larger number of wireless devices to maintain communication over a wireless network. The use of 5G communication standards to maintain connections with communication devices may allow for efficient processing of location data, identification of entities, generation of offers, negotiation of offers via data transmissions, and the like.

Although one or more aspects described herein may be directed to generating customized offers for users, in some examples, one or more of the offers generated (e.g., a first offer, one or more counter offers, or the like) may be a pre-generated offer. For instance, an offer transmitted from an entity may be a pre-generated offer that is transmitted in response to a request for first offer. Accordingly, the pre-generated offer may, in some examples, be analyzed using machine learning to generate a counter offer that may be better suited or customized to the particular user at the detected location.

In some examples, the arrangements described herein may be performed in a background without a user being aware of the offer negotiation until an offer is presented. Accordingly, the arrangements described may generate and present customized offers or outputs to a user without a user being authenticated, logging in to an account, or the like.

Additionally or alternatively, the user may request receipt of customized offers and/or may request particular offers, or the system may generate offers without a user's specific request. Accordingly, the system may default to providing offers to a user upon the user registering and might not require any additional input from the user for the user to receive offers. In some examples, the user may specifically request to receive offers and/or receive particular offers (e.g., I am shopping for a new car, please send new car offers).

As discussed herein, upon receiving user input accepting an offer, the dynamic data exchange and control computing platform 110 may enable the offer. In some examples, enabling the offer may include modifying an electronic payment system or digital wallet to include the offer. Additionally or alternatively, a coupon including a machine readable code or other code may be transmitted to the user via email, SMS, or the like.

As discussed herein, offers may be generated, negotiated, presented, accepted and the like, in real-time or near real-time to enable on-demand or background generation of customized offers for a user.

Further, as discussed herein, offers may be requested from and negotiated with one or more entities simultaneously (e.g., in parallel processing) or in series to efficiently generate optimized offers for the user.

In addition, as discussed, the user may provide predefined rules or preferences to be used in identifying an optimized offer. In some examples, the preferences may include example offers that the user indicates are very likely to be accepted, entities that the user frequents (e.g., local coffee shop, favorite lunch spot, or the like), and the like. In some examples, these preferences or predetermined rules may be used to identify an optimized offer. In other examples, the preferences may be used with machine learning to identify an optimized offer.

In some examples, the user preferences or predefined rules may include charitable organizations important to or identified by the user. Accordingly, based on a location of the user the system may provide an output indicating that he or she can help the organization. For instance, upon detection of a nearby grocery store, the system may generate an output including a reminder that the local food bank is always in need of canned goods. Although this is one example, various other example notifications may be provided without departing from the invention.

Presentation of the offer (e.g., user interface including the offer) may be performed via email, SMS, by an application executing on the user device, or the like. The offers may be generated proactively to efficiently anticipate the needs of the user and meet those needs. For instance, in arrangements in which a user may have moved to a new state, the user may be unfamiliar with the area. Accordingly, arrangements described herein may be used to generate offers or outputs introducing different entities (e.g., grocery stores, schools, urgent care locations, or the like), identifying interesting local entities based on, for example, user historical data, and the like. In some examples, the system may output recommendations for physicians, dentists, or other services in the area. In some arrangements, the system may review the user's particular insurance policy to ensure that recommended service providers are within the insurance network. In some examples, the system may also aid in facilitating transfer of medical records, emergency identification of medical professionals, or the like.

Arrangements described herein may also be used to proactively generate offers, outputs or recommendations for airfare, hotels, rental cars, and the like.

Although various aspects are described with respect to computing systems from two different entities negotiating for an optimized offer, in some examples, the negotiation may be between computing systems of the same entity. For instance, the dynamic data exchange and control computing platform 110 may be implemented by, for example, a financial institution. Upon detection of the user location, the system may identify banking centers, automated teller machines, or the like, at or near the location. In some examples, the system may generate one or more offers or outputs to present to the user (e.g., offers for products, services, or the like).

As discussed herein, aspects described provide for real-time enhanced generation of customized offers for users. By leveraging 5G communications and using computing systems and machine learning to generate and/or evaluate one or more offers, offers can be generated and presented to a user proactively, quickly and efficiently.

Figure 5:
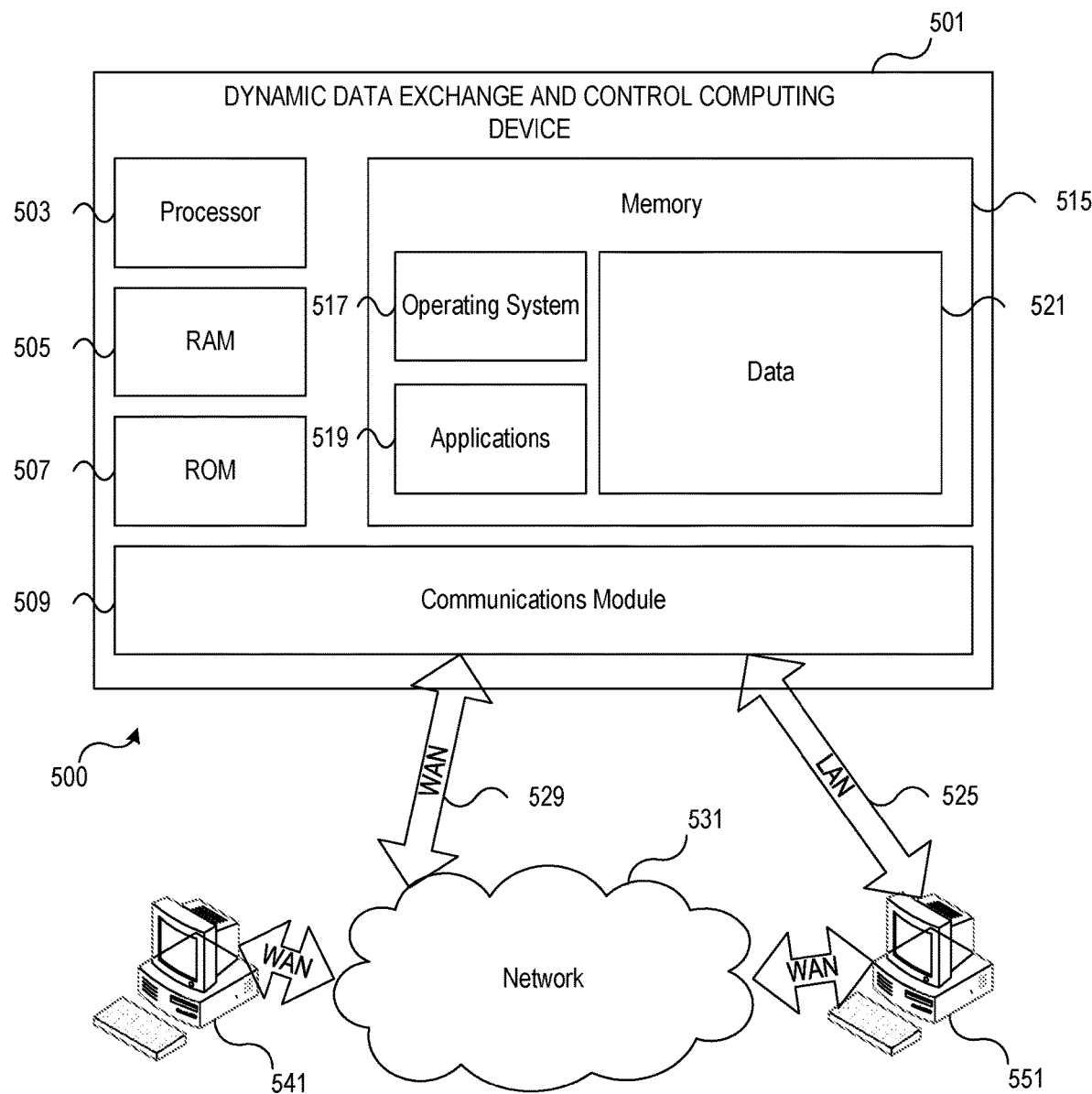
FIG. 5 illustrates one example operating environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include dynamic data exchange and control computing device 501 having processor 503 for controlling overall operation of dynamic data exchange and control computing device 501 and its associated components, including Random Access Memory (RAM) 505, Read-Only Memory (ROM) 507, communications module 509, and memory 515. Dynamic data exchange and control computing device 501 may include a variety of computer readable media. Computer readable media may be any available media that may be accessed by dynamic data exchange and control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic data exchange and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic data exchange and control computing device 501. Such a processor may execute computer-executable instructions stored on a computer-readable medium.

Software may be stored within memory 515 and/or storage to provide instructions to processor 503 for enabling dynamic data exchange and control computing device 501 to perform various functions as discussed herein. For example, memory 515 may store software used by dynamic data exchange and control computing device 501, such as operating system 517, application programs 519, and associated database 521. Also, some or all of the computer executable instructions for dynamic data exchange and control computing device 501 may be embodied in hardware or firmware. Although not shown, RAM 505 may include one or more applications representing the application data stored in RAM 505 while dynamic data exchange and control computing device 501 is on and corresponding software applications (e.g., software tasks) are running on dynamic data exchange and control computing device 501.

Communications module 509 may include a microphone, keypad, touch screen, and/or stylus through which a user of dynamic data exchange and control computing device 501 may provide input, and may also include one or more of a speaker for providing audio output and a video display device for providing textual, audiovisual and/or graphical output. Computing system environment 500 may also include optical scanners (not shown).

Dynamic data exchange and control computing device 501 may operate in a networked environment supporting connections to one or more remote computing devices, such as computing devices 541 and 551. Computing devices 541 and 551 may be personal computing devices or servers that include any or all of the elements described above relative to dynamic data exchange and control computing device 501.

The network connections depicted in FIG. 5 may include Local Area Network (LAN) 525 and Wide Area Network (WAN) 529, as well as other networks. When used in a LAN networking environment, dynamic data exchange and control computing device 501 may be connected to LAN 525 through a network interface or adapter in communications module 509. When used in a WAN networking environment, dynamic data exchange and control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
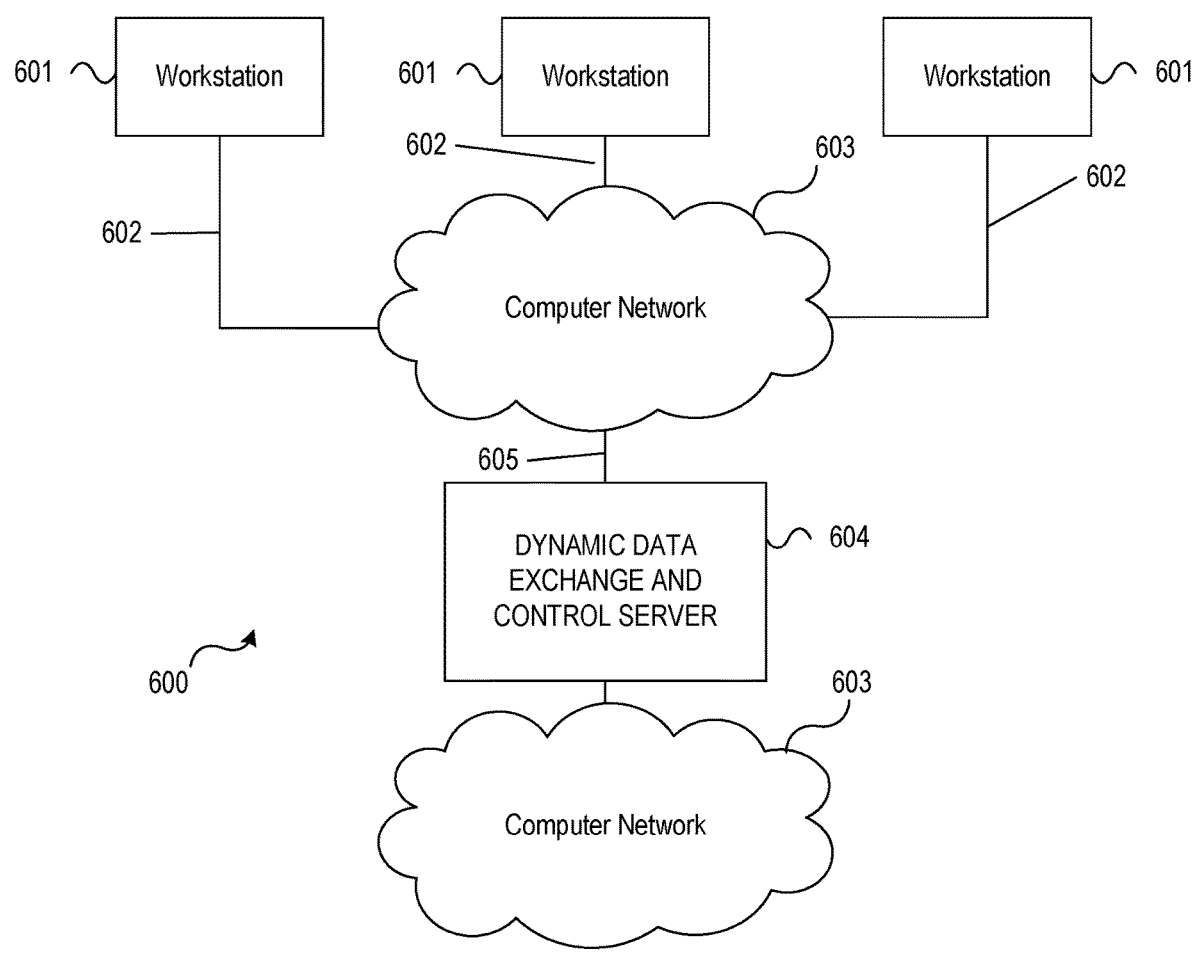
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to dynamic data exchange and control server 604. In system 600, dynamic data exchange and control server 604 may be a server, processor, computer, or data processing device, or combination of the same, configured to perform the functions and/or processes described herein. Server 604 may be used to generate requests for offers, evaluate offers received, generate counter offers, present offers to users, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and dynamic data exchange and control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      generate one or more machine learning datasets linking user data to offer data;
      continuously receive global positioning system data from a global positioning system of a user device, the global positioning system data indicating in real-time, a current location of the user device;
      identify, in real-time and based on the current location of the user device, a plurality of entities within a predefined proximity of the current location of the user device;
      receive user data;
      establish a wireless connection with a first entity computing system of a first entity of the plurality of entities;
      initiate, based on the established wireless connection, a communication session with the first entity of the plurality entities;
      transmit, to the first entity computing system and during the communication session, a request for a first offer, the request for the first offer including a subset of all of the received user data;
      receive, from the first entity computing system, the first offer;
      analyze the first offer to determine whether it meets offer criteria;
      responsive to determining that the first offer meets offer criteria:
         generate a first user interface including the first offer and selectable options for the user to accept the first offer or reject the first offer; and
         transmit, via the wireless connection, the first user interface to the user device for display on the user device;
      responsive to determining that the first offer does not meet offer criteria:
         generate a counter offer for evaluation by the first entity computing system, the counter offer being generated based on one or more user defined rules and by analyzing, using the one or more machine learning datasets, all of the received user data;
         transmit, via the wireless connection, the counter offer to the first entity computing system;
         receive, from the first entity computing system, counter offer response data, the counter offer response data including acceptance of the counter offer for presentation to the user;
         generate a second user interface including the counter offer and selectable options for the user to accept the counter offer or reject the counter offer;
         transmit, via the wireless connection, the second user interface to the user device for display on the user device;
         receive, from the user device and via the second user interface, an indication of acceptance of the counter offer;
         update the one or more machine learning datasets based on the received indication of acceptance of the counter offer; and
         modify an electronic payment system of the user to include the counter offer.

2. The computing platform of claim 1, wherein the global positioning system data is received in real-time.

3. The computing platform of claim 1, wherein the predefined proximity is customized by a user.

4. The computing platform of claim 1, wherein determining whether the first offer meets offer criteria is based on all of the user data received.

5. The computing platform of claim 1, wherein determining whether the first offer meets offer criteria is performed using machine learning.

6. The computing platform of claim 1, wherein the transmitting, to the first entity computing system and during the communication session, a request for a first offer, the request for the first offer including less than all of the received user data, transmitting, via the wireless connection, the first user interface to the user device for display on the user device, transmitting, via the wireless connection, the counter offer to the first entity computing system, and transmitting, via the wireless connection, the second user interface to the user device for display on the user device are performed using 5G communication standards.

7. The computing platform of claim 1, the instructions further including:
   transmit, to the user device, a machine readable code configured to redeem the counter offer.

8. A method, comprising:
   by a computing platform comprising at least one processor, memory, and a communication interface:
      generating, by the at least one processor, one or more machine learning datasets linking user data to offer data;
      continuously receiving, by the at least one processor and via the communication interface, global positioning system data from a global positioning system of a user device, the global positioning system data indicating in real-time, a current location of the user device;
      identifying, in real-time, by the at least one processor and based on the current location of the user device, a plurality of entities within a predefined proximity of the current location of the user device;
      receiving, by the at least one processor, user data;
      establishing, by the at least one processor, a wireless connection with a first entity computing system of a first entity of the plurality of entities;
      initiating, by the at least one processor and based on the established wireless connection, a communication session with the first entity of the plurality of entities;
      transmitting, by the at least one processor and to the first entity computing system during the communication session, a request for a first offer, the request for the first offer including a subset of all of the received user data;
      receiving, by the at least one processor and from the first entity computing system, the first offer;
      analyzing, by the at least one processor, the first offer to determine whether it meets offer criteria;
      if it is determined that the first offer meets offer criteria:
         generating, by the at least one processor, a first user interface including the first offer and selectable options for the user to accept the first offer or reject the first offer; and transmitting, by the at least one processor and via the wireless connection, the first user interface to the user device for display on the user device;
if it is determined that the first offer does not meet offer criteria:
generating, by the at least one processor, a counter offer for evaluation by the first entity computing system, the counter offer being generated based on one or more user defined rules and by analyzing, using the one or more machine learning datasets, all of the received user data;
transmitting, by the at least one processor and via the wireless connection, the counter offer to the first entity computing system;
receiving, by the at least one processor and from the first entity computing system, counter offer response data, the counter offer response data including acceptance of the counter offer for presentation to the user;
generating, by the at least one processor, a second user interface including the counter offer and selectable options for the user to accept the counter offer or reject the counter offer;
transmitting, by the at least one processor and via the wireless connection, the second user interface to the user device for display on the user device; and
receiving, by the at least one processor, from the user device and via the second user interface, an indication of acceptance of the counter offer;
updating, by the at least one processor, the one or more machine learning datasets based on the received indication of acceptance of the counter offer; and
modifying, by the at least one processor, an electronic payment system of the user to include the counter offer.

9. The method of claim 8, wherein the global positioning system data is received in real-time.

10. The method of claim 8, wherein the predefined proximity is customized by a user.

11. The method of claim 8, wherein determining whether the first offer meets offer criteria is based on all of the user data received.

12. The method of claim 8, wherein determining whether the first offer meets offer criteria is performed using machine learning.

13. One or more non-transitory computer-readable media storing instructions that, when executed by a computing platform comprising at least one processor, memory, and a communication interface, cause the computing platform to:
generate one or more machine learning datasets linking user data to offer data;
continuously receive global positioning system data from a global positioning system of a user device, the global positioning system data indicating, in real-time, a current location of the user device;
identify, in real-time and based on the current location of the user device, a plurality of entities within a predefined proximity of the current location of the user device;
receive user data;
establish a wireless connection with a first entity computing system of a first entity of the plurality of entities;
initiate, based on the established wireless connection, a communication session with the first entity of the plurality of entities;
transmit, to the first entity computing system and during the communication session, a request for a first offer, the request for the first offer including a subset of all of the received user data;
receive, from the first entity computing system, the first offer;
analyze the first offer to determine whether it meets offer criteria;
responsive to determining that the first offer meets offer criteria:
generate a first user interface including the first offer and selectable options for the user to accept the first offer or reject the first offer; and
transmit, via the wireless connection, the first user interface to the user device for display on the user device;
responsive to determining that the first offer does not meet offer criteria:
generate a counter offer for evaluation by the first entity computing system, the counter offer being generated based on one or more user defined rules and by analyzing, using the one or more machine learning datasets, all of the received user data;
transmit, via the wireless connection, the counter offer to the first entity computing system;
receive, from the first entity computing system, counter offer response data, the counter offer response data including acceptance of the counter offer for presentation to the user;
generate a second user interface including the counter offer and selectable options for the user to accept the counter offer or reject the counter offer;
transmit, via the wireless connection, the second user interface to the user device for display on the user device;
receive, from the user device and via the second user interface, an indication of acceptance of the counter offer;
update the one or more machine learning datasets based on the received indication of acceptance of the counter offer; and
modify an electronic payment system of the user to include the counter offer.

14. The one or more non-transitory computer-readable media of claim 13, wherein the global positioning system data is received in real-time.

15. The one or more non-transitory computer-readable media of claim 13, wherein the predefined proximity is customized by a user.

16. The one or more non-transitory computer-readable media of claim 13, wherein determining whether the first offer meets offer criteria is based on all of the user data received.

17. The one or more non-transitory computer-readable media of claim 13, wherein determining whether the first offer meets offer criteria is performed using machine learning.

* * * * *